(12) United States Patent
Mu

(10) Patent No.: US 11,188,176 B2
(45) Date of Patent: Nov. 30, 2021

(54) TOUCH PANEL AND MANUFACTURE THEREOF, TOUCH DEVICE

(71) Applicants: BOE Technology Group Co., Ltd., Beijing (CN); Hefei Xinsheng Optoelectronics Technology Co., Ltd., Anhui (CN)

(72) Inventor: Suzhen Mu, Beijing (CN)

(73) Assignees: BOE Technology Group Co., Ltd., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 723 days.

(21) Appl. No.: 16/070,913

(22) PCT Filed: Nov. 29, 2017

(86) PCT No.: PCT/CN2017/113476
§ 371 (c)(1),
(2) Date: Jul. 18, 2018

(87) PCT Pub. No.: WO2018/205560
PCT Pub. Date: Nov. 15, 2018

(65) Prior Publication Data
US 2021/0208732 A1 Jul. 8, 2021

(30) Foreign Application Priority Data
May 12, 2017 (CN) .......................... 201710335259.5

(51) Int. Cl.
*G06F 3/044* (2006.01)
*G06F 3/041* (2006.01)
*G02F 1/1362* (2006.01)

(52) U.S. Cl.
CPC ...... *G06F 3/0443* (2019.05); *G02F 1/136204* (2013.01); *G06F 3/0412* (2013.01);
(Continued)

(58) Field of Classification Search
CPC .... G06F 3/0445; G06F 3/0412; G06F 3/0446; G06F 3/0448; G06F 2203/04103; G06F 2203/04111; G02F 1/136204
See application file for complete search history.

(56) References Cited

U.S. PATENT DOCUMENTS

2014/0210784 A1* 7/2014 Gourevitch .......... H03K 17/962
345/174
2015/0042908 A1* 2/2015 Wang ...................... G06F 3/041
349/12
(Continued)

FOREIGN PATENT DOCUMENTS

CN 201812113 U 4/2011
CN 104835439 A 8/2015
(Continued)

OTHER PUBLICATIONS

Mar. 5, 2018—(WO) International Search Report and Written Opinion Appn PCT/CN2017/113476 with English Translation.
(Continued)

*Primary Examiner* — Md Saiful A Siddiqui
(74) *Attorney, Agent, or Firm* — Banner & Witcoff, Ltd.

(57) ABSTRACT

A touch panel and a manufacture thereof, and a touch device are disclosed. The touch panel includes: a plurality of first touch electrodes, at least one second touch electrode, and a plurality of first display electrodes. The plurality of first touch electrodes and the second touch electrode are stacked and insulated from each other, each of the plurality of first touch electrodes comprises at least one touch electrode pattern, each of the plurality of first display electrodes comprises a display electrode pattern, and the touch electrode pattern and the display electrode pattern match with each other.

17 Claims, 8 Drawing Sheets

(52) U.S. Cl.
CPC .......... *G06F 3/0445* (2019.05); *G06F 3/0446* (2019.05); *G06F 3/0448* (2019.05); *G06F 2203/04103* (2013.01); *G06F 2203/04111* (2013.01)

(56) References Cited

U.S. PATENT DOCUMENTS

2016/0224147 A1* 8/2016 Ding .................... G06F 3/0446
2017/0123544 A1* 5/2017 Ham .................... G06F 3/0412
2018/0157082 A1 6/2018 Wang

FOREIGN PATENT DOCUMENTS

| CN | 105159514 A | 12/2015 |
|---|---|---|
| CN | 106201149 A | 12/2016 |
| CN | 106527790 A | 3/2017 |

OTHER PUBLICATIONS

Nov. 29, 2019—(CN) Third Office Action Appn 201710335259.5 with English Translation.

* cited by examiner

| forming a plurality of first touch electrodes and at least one second touch electrode, each of the plurality of first touch electrodes comprising at least one touch electrode pattern, and the plurality of first touch electrodes and the second touch electrode being stacked and insulated from each other | ~ S1 |

↓

| forming a plurality of first display electrodes, each of the plurality of first display electrodes comprising a display electrode pattern | ~ S2 |

Fig. 9

TOUCH PANEL AND MANUFACTURE THEREOF, TOUCH DEVICE

The application is a U.S. National Phase Entry of International Application No. PCT/CN2017/113476 filed on Nov. 29, 2017, designating the United States of America and claiming priority to Chinese Patent Application No. 201710335259.5, filed on May 12, 2017. The present application claims priority to and the benefit of the above-identified applications and the above-identified applications are incorporated by reference herein in their entirety.

TECHNICAL FIELD

Embodiments of the present disclosure relate to a touch panel and a manufacture thereof, and a touch device.

BACKGROUND

In general, touch technology may include capacitive touch technology, surface acoustic wave touch technology, resistive touch technology, optical touch technology, and so on. The capacitive touch technology has advantages of high reliability, good durability, etc., thus the capacitive touch technology develops rapidly, and has been widely used in mobile phones, tablets, notebook, computers and other electronic products.

With continuous development of the touch technology, multi-touch technology has become a research direction of the touch technology, and the multi-touch technology can simultaneously accept touch information from multiple points on the touch panel, so as to perform human-computer interaction. The multi-touch technology can achieve touch operations such as zooming, rotating, page turning, and translation, thereby increasing diversity of human-computer interaction, achieving more functions, and improving operation experience of a user.

SUMMARY

At least one embodiment of the present disclosure provides a touch panel, which comprises: a plurality of first touch electrodes, at least one second touch electrode, and a plurality of first display electrodes. The plurality of first touch electrodes and the second touch electrode are stacked and insulated from each other, each of the plurality of first touch electrodes comprises at least one touch electrode pattern, each of the plurality of first display electrodes comprises a display electrode pattern, and the touch electrode pattern and the display electrode pattern match with each other.

For example, in the touch panel provided by an embodiment of the present disclosure, the touch electrode pattern comprises a plurality of touch electrode strips, and the display electrode pattern comprises a plurality of display electrode strips.

For example, the touch panel provided by an embodiment of the present disclosure further comprises a first substrate and a second substrate disposed parallel to each other, the plurality of first touch electrodes are arranged in an array on the first substrate, the second touch electrode is on the first substrate, the plurality of first display electrodes are arranged in an array on the second substrate, and in a direction perpendicular to the first substrate and the second substrate, the touch electrode pattern and the display electrode pattern substantially overlap each other.

For example, in the touch panel provided by an embodiment of the present disclosure, the plurality of first touch electrodes and the second touch electrode are on a same side or different sides of the first substrate, and with respect to the plurality of first touch electrodes, the second touch electrode is closer to the second substrate.

For example, in the touch panel provided by an embodiment of the present disclosure, the second touch electrode is a plate electrode.

For example, the touch panel provided by an embodiment of the present disclosure comprises a plurality of second touch electrodes, and each of the plurality of second touch electrodes corresponds to at least two first touch electrodes.

For example, in the touch panel provided by an embodiment of the present disclosure, the plurality of first touch electrodes are arranged in an array of rows and columns; the plurality of second touch electrodes are arranged in rows, each of the plurality of second touch electrodes corresponds to all the first touch electrodes in at least one row; or the plurality of second touch electrodes are arranged in columns, each of the plurality of second touch electrodes corresponds to all the first touch electrodes in at least one column.

For example, the touch panel provided by an embodiment of the present disclosure further comprises a plurality of first electrode leads and at least one second lead, the plurality of first electrode leads are electrically connected with the plurality of first touch electrodes and are used for transmitting electrical signals, and the second lead is electrically connected with the second touch electrode and is used for transmitting an electrical signal.

For example, in the touch panel provided by an embodiment of the present disclosure, the plurality of first electrode leads are electrically connected with the plurality of first touch electrodes in one-to-one correspondence.

For example, in the touch panel provided by an embodiment of the present disclosure, the plurality of first electrode leads extend in a same direction.

For example, the touch panel provided by an embodiment of the present disclosure further comprises at least one third electrode lead, and the third electrode lead is connected between the second touch electrode and a ground line, and is used for transmitting electrostatic charges on the second touch electrode to the ground line.

For example, in the touch panel provided by an embodiment of the present disclosure, the plurality of first touch electrodes, the second touch electrode and the plurality of first display electrodes are all transparent electrodes.

For example, in the touch panel provided by an embodiment of the present disclosure, the plurality of first display electrodes are pixel electrodes or common electrodes.

For example, the touch panel provided by an embodiment of the present disclosure further comprises a plurality of second display electrodes, the plurality of first display electrodes and the plurality of second display electrodes are stacked and insulated from each other; the plurality of first display electrodes are comb-shaped electrodes while the plurality of second display electrodes are plate electrodes, or the plurality of first display electrodes are plate electrodes while the plurality of second display electrodes are comb-shaped electrodes; the plurality of first display electrodes are pixel electrodes while the plurality of second display electrodes are common electrodes, or the plurality of first display electrodes are common electrodes while the plurality of second display electrodes are pixel electrodes.

For example, in the touch panel provided by an embodiment of the present disclosure, the first substrate and the second substrate are opposite to each other to form a liquid crystal touch panel, the first substrate is an opposite substrate, and the second substrate is an array substrate.

For example, the touch panel provided by an embodiment of the present disclosure further comprises a third substrate, the second substrate and the third substrate are opposite to each other to form a liquid crystal touch panel, the second substrate is an array substrate, the third substrate is an opposite substrate, and the first substrate is on a side of the third substrate far away from the second substrate.

At least one embodiment of the present disclosure provides a touch device, which comprises any one of the touch panels described above.

For example, the touch device provided by an embodiment of the present disclosure further comprises a touch chip, and the touch chip is configure to apply electrical signals to the plurality of first touch electrodes or the second touch electrode, and correspondingly the touch chip is further configured to read electrical signals from the second touch electrode or the plurality of first touch electrodes.

For example, in the touch device provided by an embodiment of the present disclosure, the touch panel is configure to display an image, and the plurality of first touch electrodes and the second touch electrode are on a display side of the touch panel.

At least one embodiment of the present disclosure provides a manufacture method of a touch panel, comprising: forming a plurality of first touch electrodes and at least one second touch electrode, each of the plurality of first touch electrodes comprising at least one touch electrode pattern, and the plurality of first touch electrodes and the second touch electrode being stacked and insulated from each other; and forming a plurality of first display electrodes, each of the plurality of first display electrodes comprising a display electrode pattern, and the touch electrode pattern and the display electrode pattern matching with each other.

At least one embodiment of the present disclosure provides a touch panel and a manufacture thereof, and a touch device. In the touch panel, a touch electrode pattern of a touch electrode is matched with a display electrode pattern of a display electrode, thereby reducing or avoiding a moiré phenomenon and improving quality of a display image.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

FIG. 9 is a schematic flow chart of a manufacture method of a touch panel provided by an embodiment of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects.

In order to make the following description of the embodiments of the present disclosure clear and concise, the present disclosure omits detailed description of known functions and known components.

In a field of touch technology, single-layer on-cell (SLOC) touch technology process is relatively simple, multi-points touch technology can be achieved by forming a single layer of indium tin oxide electrode pattern on a display panel, and therefore the SLOC touch technology has extremely high competitiveness in a portable electronic products market.

Figure 1A:
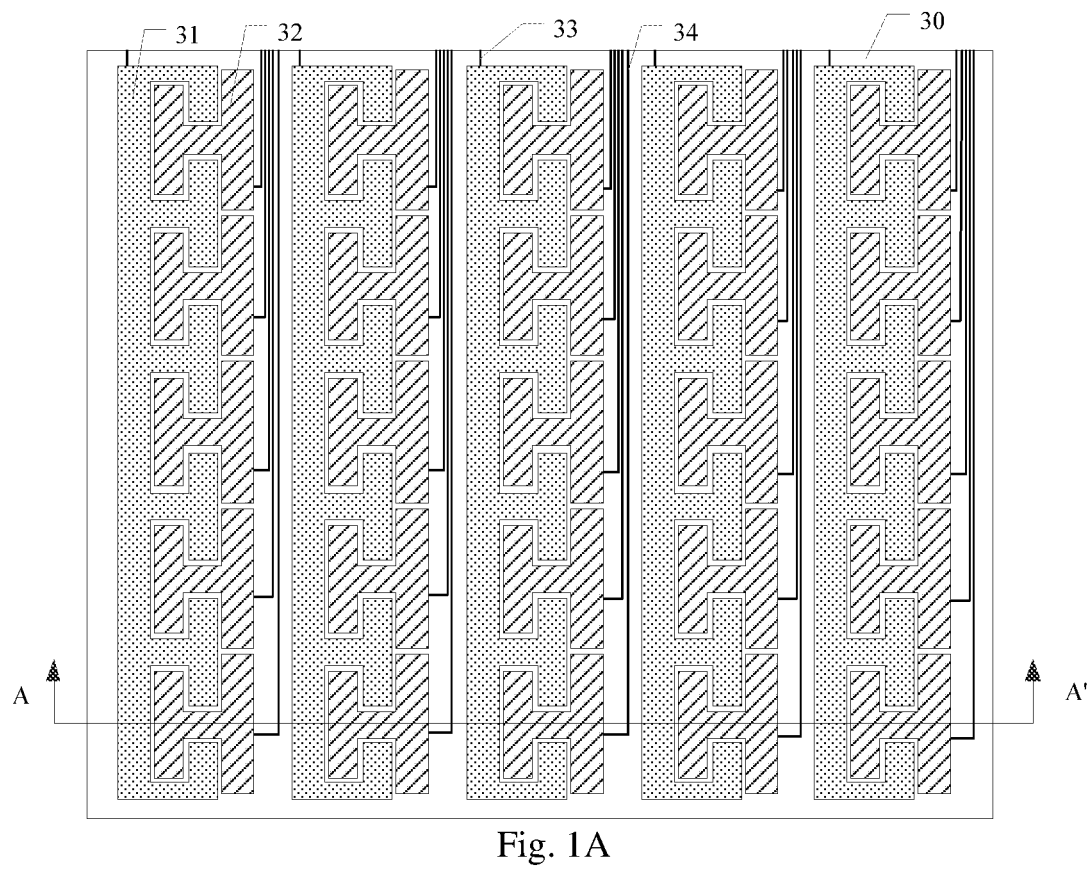
FIG. 1A is a planar schematic diagram of a touch panel.
Figure 1B:
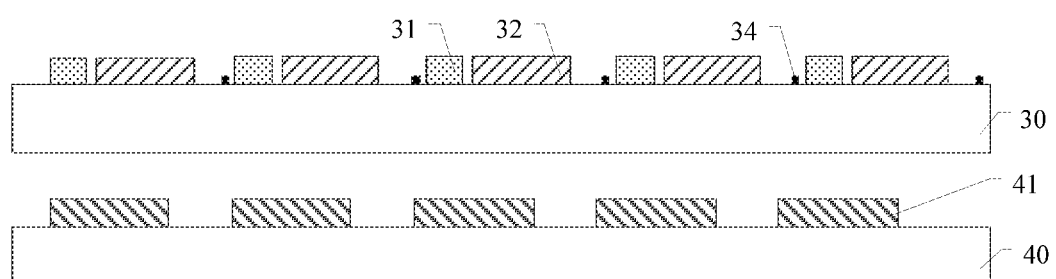
FIG. 1B is a cross-sectional structural schematic diagram of the touch panel along a line A-A' show in FIG. 1A.

Currently, the SLOC touch technology mainly uses capacitance formed by touch sensing electrodes and touch driving electrodes in a same layer, so as to achieve receiving of touch signals and to perform touch operations. FIG. 1A shows a planar schematic diagram of a touch panel, FIG. 1B shows a cross-sectional structural schematic diagram of the touch panel along a line A-A' show in FIG. 1A. The touch panel shown in FIG. 1A is a SLOC touch panel.

For example, as shown in FIG. 1A and FIG. 1B, a SLOC touch panel comprises a color filer substrate 30 and an array substrate 40. The color filer substrate 30 is provided with a plurality of touch driving electrodes 31 and a plurality of touch sensing electrodes 32. The plurality of touch driving electrodes 31 are insulated from the plurality of touch sensing electrodes 32, the plurality of touch driving electrodes 31 are also insulated from each other, and the plurality of touch sensing electrodes 32 are also insulated from each other. For example, the plurality of touch driving electrodes 31 are arranged in columns, and the plurality of touch sensing electrodes 32 are arranged in an array of rows and columns. All the touch sensing electrodes 32 in a same column correspond to one touch driving electrode 31, and a mutual capacitor can be formed at a gap between a touch sensing electrode 32 and a touch driving electrode 31, so that a touch signal can be sensed and a touch function can be achieved.

For example, the color filer substrate 30 is further provided with a plurality of driving electrode lines 33 and a plurality of sensing electrode lines 34, and the plurality of driving electrode lines 33 and the plurality of sensing electrode lines 34 are electrically connected to, for example, a touch control chip (not shown). Each touch driving electrode 31 is electrically connected to a driving electrode line 33 to transmit a driving signal. Each touch sensing electrode 32 is electrically connected to a sensing electrode line 34 to transmit a sensing signal. In a case where a finger touches the touch panel, coupling capacitance between the touch sensing electrode 32 that is touched and the touch driving electrode 31 corresponding thereto changes, thereby changing the capacitance between the touch sensing electrode 32 and the touch driving electrode 31. For example, in a case where the same driving signal is applied to all the touch driving electrodes 31, the touch control chip can determine a touch position by detecting sensing signals transmitted on the sensing electrode lines 34 during a touch period.

Due to manufacturing process limitation, the gap formed between a touch driving electrode 31 and a touch sensing electrode 32 in the same layer is narrow, so that electric field intensity of the formed mutual capacitor is limited, resulting in poor sensitivity and low touch accuracy of the touch panel.

For example, a plurality of pixel electrodes 41 are provided on the array substrate 40, and the plurality of pixel electrodes 41 are arranged in an array, for example, each pixel electrode 41 may have a slit pattern. During operation of displaying, the plurality of pixel electrodes 41 can form a first stripe, the plurality of touch driving electrodes 31 can form a second stripe, and the plurality of touch sensing electrodes 32 can form a third stripe. Because slight difference exists in spatial frequency between the first stripe and the second stripe and/or the third stripe, when the first stripe and the second stripe and/or the third stripe are superimposed, due to the difference in stripe gaps, an overlap position of the first stripe and the second stripe and/or the third stripe gradually shifts, forming moiré, which affects the quality of the display image.

In addition, for an advanced super dimension switch (ADS) mode display panel, the electrode structure design of the SLOC touch panel requires to sacrifice an electrostatic discharge path of electrodes on the entire surface of the SLOC touch panel. Thus, for example, static charges generated during operation, transportation, etc. of a product cannot be released, so the static charges are accumulated, resulting in that the electro-static discharge (ESD) occurs, which leads to ESD damage and causes undesirable phenomena such as greening of a displayed image; on the other hand, the SLOC touch panel requires a relatively high operation environment and has poor operation repeatability.

At least one embodiment of the present disclosure provides a touch panel and a manufacture thereof, and a touch device. The touch panel of this embodiment comprises a plurality of first touch electrodes, at least one second touch electrode, and a plurality of first display electrodes. The plurality of first touch electrodes and the second touch electrode are stacked and insulated from each other, each of the plurality of first touch electrodes comprises at least one touch electrode pattern, each of the plurality of first display electrodes comprises a display electrode pattern, and the touch electrode pattern and the display electrode pattern match with each other.

In the touch panel, a touch electrode pattern of a first touch electrode is matched with a display electrode pattern of a first display electrode, so as to reduce or avoid a moiré phenomenon and improve the quality of the display image.

A touch panel and a manufacture thereof, and a touch device provided by the embodiments of the present disclosure will be described below in detail with reference to the accompanying drawings.

Figure 2A:
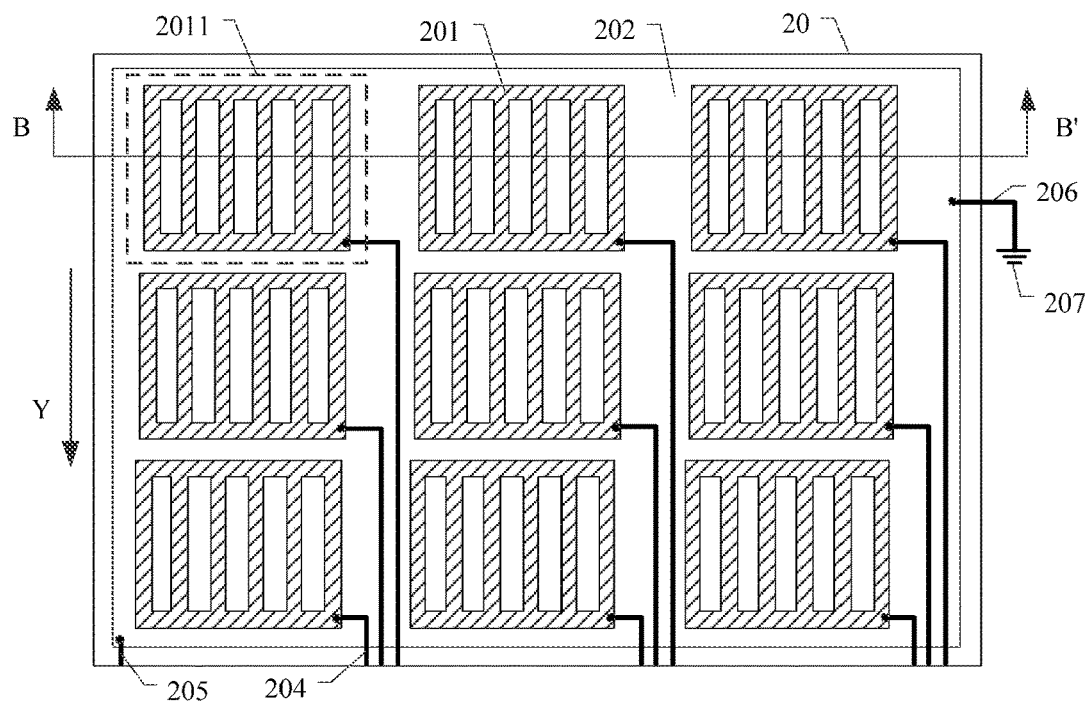
FIG. 2A is a planar schematic diagram of a first substrate of a touch panel provided by an embodiment of the present disclosure.
Figure 2B:
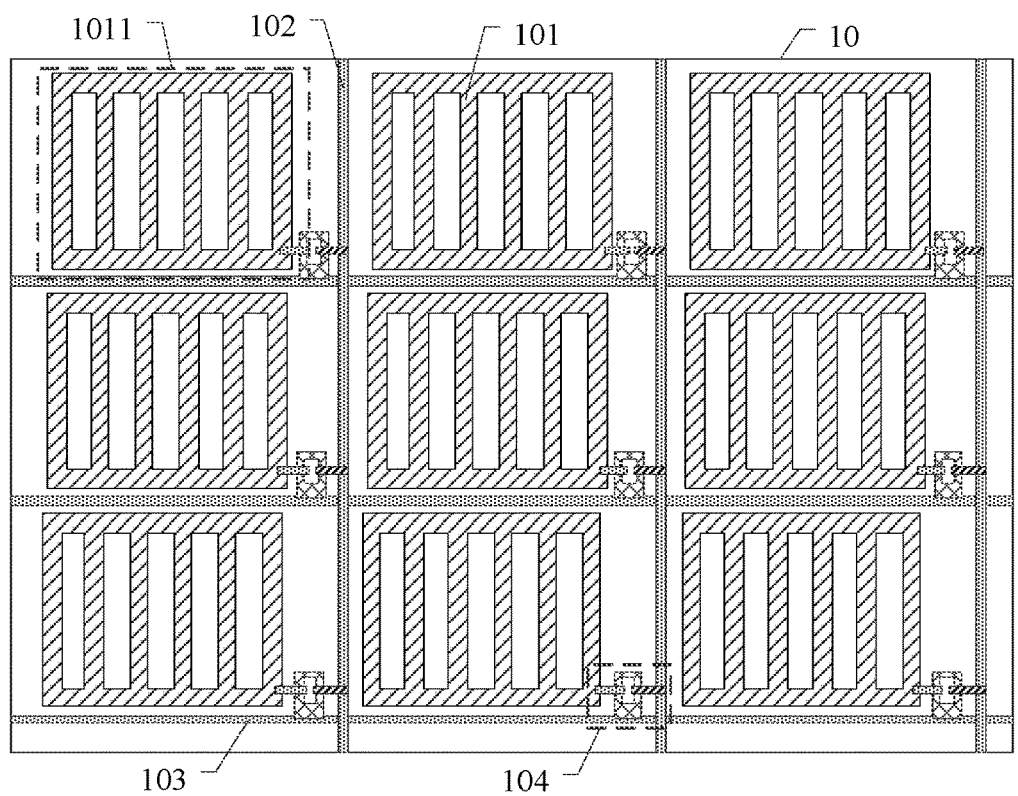
FIG. 2B is a planar schematic diagram of a second substrate of a touch panel provided by an embodiment of the present disclosure.
Figure 2C:
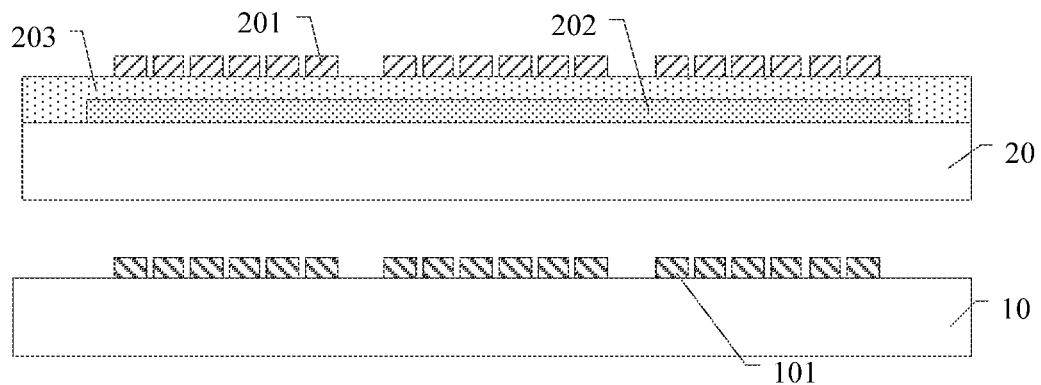
FIG. 2C is a cross-sectional structural schematic diagram of the touch panel along a line B-B' show in FIG. 2A.
Figure 3:
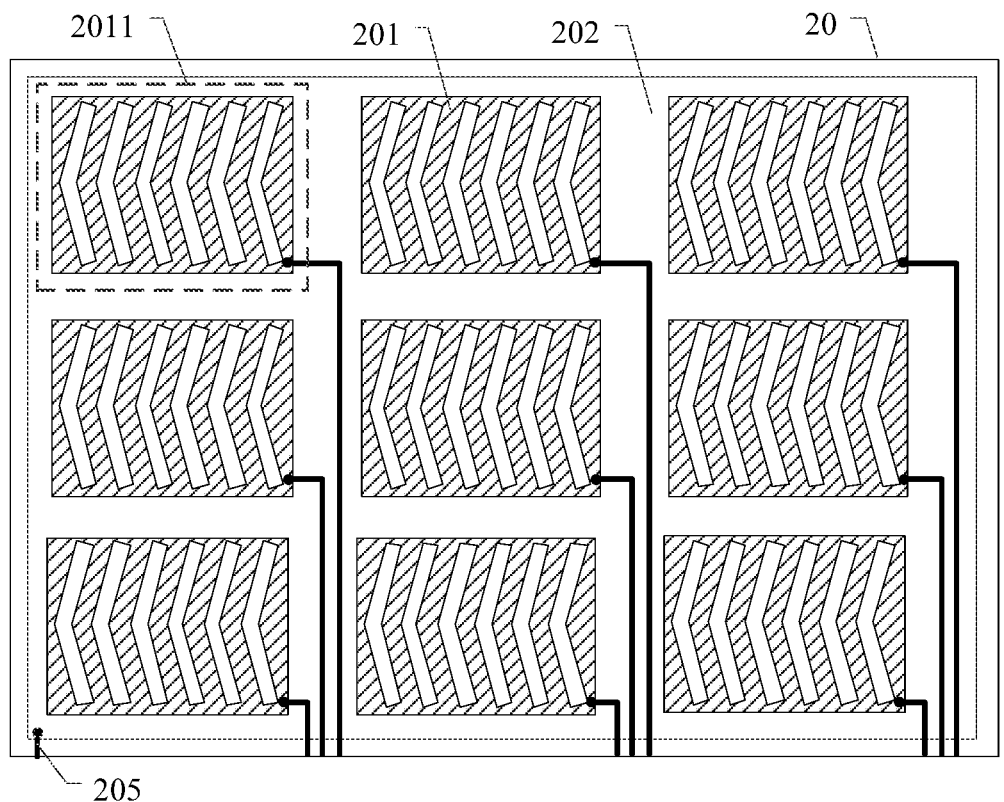
FIG. 3 is a structural schematic diagram of another first substrate of a touch panel provided by an embodiment of the present disclosure.
Figure 4:
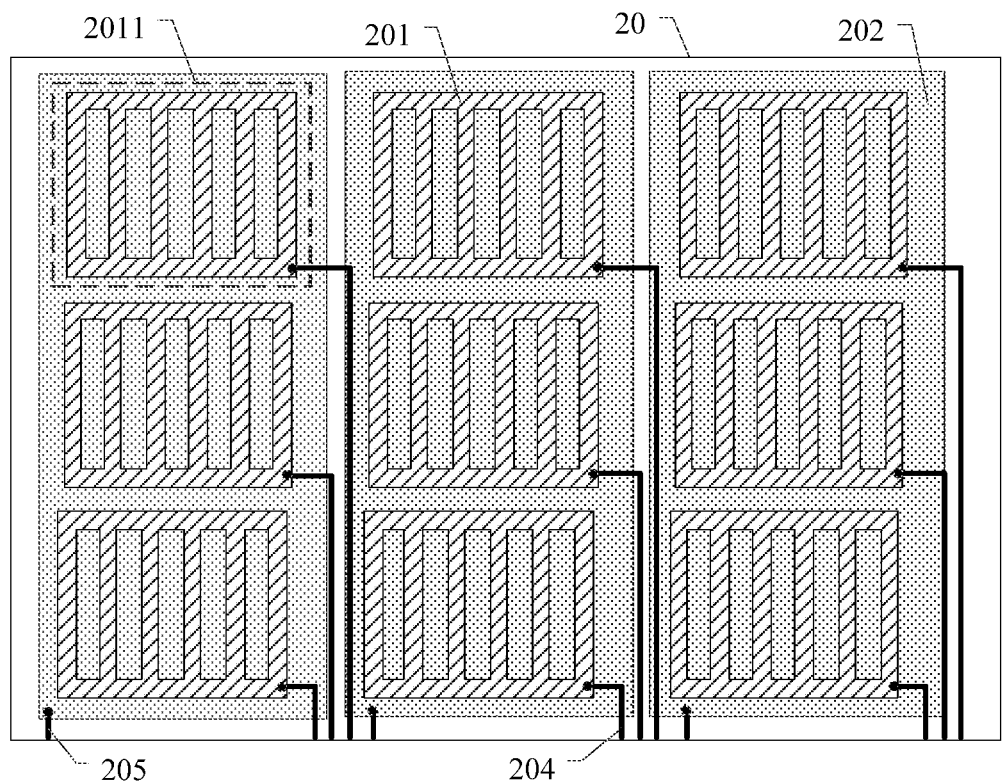
FIG. 4 is a structural schematic diagram of yet another first substrate of a touch panel provided by an embodiment of the present disclosure.

An embodiment of the present disclosure provides a touch panel. FIG. 2A shows a planar schematic diagram of a first substrate of a touch panel provided by an embodiment of the present disclosure; FIG. 2B shows a planar schematic diagram of a second substrate of a touch panel provided by an embodiment of the present disclosure; FIG. 2C is a cross-sectional structural schematic diagram of the touch panel along a line B-B' show in FIG. 2A; FIG. 3 shows a structural schematic diagram of another first substrate of a touch panel provided by an embodiment of the present disclosure; FIG. 4 shows a structural schematic diagram of yet another first substrate of a touch panel provided by an embodiment of the present disclosure.

For example, as shown in FIG. 2A to FIG. 2C, the touch panel comprises a plurality of first touch electrodes 201, at least one second touch electrode 202, and a plurality of first display electrodes 101. The plurality of first touch electrodes 201 and the second touch electrode 202 are stacked and insulated from each other, each of the plurality of first touch electrodes 201 comprises at least one touch electrode pattern 2011, each of the plurality of first display electrodes 101 comprises a display electrode pattern 1011, and the touch electrode pattern 2011 and the display electrode pattern 1011 match with each other.

In the touch panel provided by the embodiments of the present disclosure, the touch electrode pattern 2011 and the display electrode pattern 1011 match with each other, and a period of the touch electrode pattern 2011 may be consistent with a period of the display electrode pattern 1011. In a case where the first touch electrode 201 overlaps with the first display electrode 101, an overlap position of the first touch electrode 201 and the first display electrode 101 is not offset, so that a spatial beat frequency effect of the periodic first touch electrodes 201 and the periodic first display electrodes 101 can be avoided, and accordingly, moiré generated on the touch panel can be reduced or avoided, and the quality of the display image can be improved.

It should be noted that, in the description of the present disclosure, the phrase "match with each other" may indicate that the touch electrode pattern 2011 and the display electrode pattern 1011 are substantially the same. For example, in a direction perpendicular to the first substrate 20, an orthographic projection of the touch electrode pattern 2011 on the first substrate 20 and an orthographic projection of the display electrode pattern 1011 on the first substrate 20 substantially overlap each other, the phrase "substantially overlap each other" can mean completely overlapping or basically overlapping. The phrase "match with each other" may also indicate that a spatial arrangement period of the touch electrode pattern 2011 and a spatial arrangement period of the display electrode pattern 1011 have an integer multiple relationship. That is to say, the touch electrode pattern 2011 is roughly the same as a periodic electrode pattern formed by a plurality of display electrode patterns 1011, or the display electrode pattern 1011 is roughly the same as a periodic electrode pattern formed by a plurality of touch electrode patterns 2011. For example, the touch electrode pattern 2011 may be roughly the same as a periodic electrode pattern formed by N display electrode patterns 1011, where N is a positive integer. The phrase "roughly the same" can mean that the electrode patterns are completely the same, and can also mean that the electrode patterns are substantially the same (such as, approximately the same).

For example, as shown in FIG. 2A and FIG. 2B, in an example, the plurality of first touch electrodes 201 are in one-to-one correspondence to the plurality of first display electrodes 101. An arrangement period of the plurality of first touch electrodes 201 is consistent with an arrangement period of the plurality of first display electrodes 101, and the touch electrode pattern 2011 and the display electrode pattern 1011 are basically identical, so that the structure of the touch electrodes according to the embodiments of the present disclosure can reduce the moiré phenomenon, even eliminate the moiré phenomenon, and improve the display quality; on the other hand, because the touch electrode pattern 2011 and the display electrode pattern 1011 are basically identical, the first touch electrode 201 and the first display electrode 101 can be formed by using same one mask plate, so as to save a quantity of used mask plates and save production cost. It should be noted that, "identical" can indicate roughly the same.

For another example, each first touch electrode 201 may also correspond to first display electrodes 101, each first touch electrode 201 may comprises touch electrode patterns 2011, and the touch electrode patterns 2011 are in one-to-one correspondence to display electrode patterns 1011 formed by the first display electrodes 101. For example, each first touch electrode 201 may correspond to five first display electrodes 101 in the same column or the same row, thus the first touch electrode 201 can comprise five touch electrode patterns 2011 arranged in a column or a row, and the five touch electrode patterns 2011 are arranged at intervals and are in one-to-one correspondence to five first display electrodes 101; alternatively, each first touch electrode 201 may also correspond to four first display electrodes 101 arranged in two rows and two columns, thus the first touch electrode 201 may comprise four touch electrode patterns 2011 arranged in two rows and two columns. It should be noted that, each touch electrode pattern 2011 may also correspond to a display electrode pattern 1011 formed by first display electrodes 101. The embodiments of the present disclosure are not limited to the above situations.

For example, the first touch electrode 201 and the first display electrode 101 may be slit electrodes, so that the touch electrode pattern 2011 comprises a plurality of touch electrode strips disposed at intervals, the display electrode pattern comprises a plurality of display electrode strips disposed at intervals, and the plurality of touch electrode strips in each first touch electrode 201 are electrically connected to each other, and the plurality of display electrode stripes in each first display electrode 101 are also electrically connected to each other. As shown in FIG. 2A and FIG. 2B, in an example, the touch electrode stripes and the display electrode stripes are rectangular electrode stripes; as shown in FIG. 3, the touch electrode stripes may also be saw-tooth shaped electrode stripes, correspondingly, the display electrode stripes may also be saw-tooth shaped electrode stripes, so that the display area corresponding to each first display electrode 101 can be provided with a plurality of domains, and the display electrode stripes in different domains have different extending directions. Thus, the touch panel can further have effects of compensating color deviation and suppressing grayscale inversion, or effects of enlarging viewing angle, shortening response time, and improving product quality. It should be noted that, shapes and extending directions of the touch electrode stripes and the display electrode stripes are not limited to those shown in the accompanying drawings, and the present disclosure is not limited thereto.

For example, the first touch electrode 201 and the second touch electrode 202 are provided in mutual-capacitive touch technology, so for example multi-touch technology can be implemented. A coupling capacitor is formed at an overlap position of the first touch electrode 201 and the second touch electrode 202. A touch position can be determined and a touch function can be achieved by detecting the change amplitude of the capacitance value of the coupling capacitor.

For example, as shown in FIG. 2A to FIG. 2C, the touch panel further comprises a first substrate 20 and a second substrate 10, and the first substrate 20 and the second substrate 10 are arranged parallel to each other. For example, in a direction perpendicular to the first substrate 20, an orthographic projection of the first substrate 20 on the second substrate 10 may substantially overlap with the second substrate 10.

For example, the plurality of the first touch electrodes 201 are arranged in an array on the first substrate 20, and the second touch electrode 202 is also disposed on the first substrate 20. The plurality of first display electrodes 101 are arranged in an array on the second substrate 10. In a direction perpendicular to the first substrate 20, the touch electrode pattern 2011 and the display electrode pattern 1011 substantially overlap each other.

For example, each first touch electrode 201 may form a touch sensing point. As shown in FIG. 2A, in an example, adjacent two first touch electrodes are disposed at a certain distance and are insulated from each other, so that each first touch electrode 201 may form a touch sensing point. It should be noted that each touch sensing point may also be formed by first touch electrodes 201. For example, adjacent two first touch electrodes 201 in the same row may be electrically connected to form a touch sensing point. The embodiment of the present disclosure is not limited to the above situations.

It should be noted that, according to requirements, such as size, accuracy and aperture ratio, of the touch panel, the quantity of the plurality of first touch electrodes 201 and spacing of the plurality of first touch electrodes 201 may be specifically designed according to actual conditions. For example, in a case where the required accuracy is low, in order to increase the aperture ratio, the quantity of the plurality of first touch electrodes 201 may be reduced, and the spacing between adjacent first touch electrodes 201 is increased. On the other side, in a case where the required accuracy is high, the quantity of the plurality of first touch electrodes 201 may be increased, and the spacing between adjacent first touch electrodes 201 may be reduced. In addition, the quantity of the second touch electrodes 202 and spacing of the second touch electrodes 202 may also be specifically designed according to actual conditions.

For example, the first touch electrodes 201 and the second touch electrode 202 are on a same side or different sides of the first substrate 20, and compared with respect to the first touch electrodes 201, the second touch electrode 202 is closer to the second substrate 10. For example, as shown in FIG. 2C, in an example, the first touch electrodes 201 and the second touch electrode 202 all are on the surface of a side of the first substrate 20, which side is far away from the second substrate 10. For another example, the second touch electrode 202 may also be on the surface of the first substrate 20 closer to the second substrate 10, and the first touch electrodes 201 are on the surface of the first substrate 20 far away from the second substrate 10.

For example, the first touch electrodes 201 and the second touch electrode 202 are stacked and insulated from each other, so as to form a vertical electric field structure. As shown in FIG. 2C, the touch panel further comprises a first insulation layer 203, and the first insulation layer 203 is disposed between the first touch electrodes 201 and the second touch electrode 202, so as to insulate the first touch electrodes 201 and the second touch electrode 202. For example, the first insulation layer 203 may cover the second touch electrode 202 from the above, so that the first touch electrodes 201 and the second touch electrode 202 form a vertical electric field, and the vertical electric field exists in the entire touch panel, thereby enhancing electric field intensity between the first touch electrodes 201 and the second touch electrode 202 and improving touch accuracy.

For example, as shown in FIG. 2A, the second touch electrode 202 may be a plate electrode. The plate electrode can quickly transmit the electrostatic charges on the second touch electrode 202 to a ground terminal, so as to avoid accumulating electrostatic charges and generating electrostatic discharge to cause ESD damage to the touch panel, ameliorate the undesirable phenomenon of electrostatic discharge, and improve yield rate of a touch product.

For example, the touch panel may comprise a plurality of second touch electrodes 202. Each second touch electrode 202 corresponds to at least two first touch electrodes 201 so as to form coupling capacitors at overlap positions of the electrodes.

For example, the plurality of first touch electrodes 201 are arranged in rows and columns, the plurality of second touch electrodes 202 are arranged in rows while in one column, and each second touch electrode 202 corresponds to all the first touch electrodes 201 in at least one row; alternatively, the plurality of second touch electrodes 202 are arranged in one row while in columns, each second touch electrode 202 corresponds to all the first touch electrodes 201 in at least one column. For example, as shown in FIG. 4, in an example, the touch panel comprises three stripe-shaped second touch electrodes 202. The three stripe-shaped second touch electrodes 202 are arranged in one row and three columns, and each stripe-shaped second touch electrode 202 corresponds to three first touch electrodes 201 in the same columns, so as to form coupling capacitors at overlap positions of the electrodes.

It should be noted that, the plurality of second touch electrodes 202 may also be arranged in rows and columns. For example, the plurality of first touch electrodes 201 are arranged in three rows and four columns, and the plurality of second touch electrodes 202 are arranged in three rows and two columns. Each second touch electrode 202 corresponds to two first touch electrodes 201 in one row.

For example, as shown in FIG. 2A, the touch panel further comprises a plurality of first electrode leads 204 and at least one second lead 205. The plurality of first electrode leads 204 are electrically connected with the plurality of first touch electrodes 201 and are used for transmitting electrical signals, and the second lead 205 is electrically connected with the second touch electrode 202 and is used for transmitting an electrical signal. The first electrode lead 204 and the second lead 205 can respectively lead the first touch electrodes 201 and the second touch electrode 202 out of an touch area and electrically connect the first touch electrodes 201 and the second touch electrode 202 to, for example, a touch chip (not shown), so as to apply control signals to the first touch electrodes 201 and the second touch electrode 202 or read control signals from the first touch electrodes 201 and the second touch electrode 202.

For example, the plurality of first electrode leads 204 are electrically connected in one-to-one correspondence with the plurality of first touch electrodes 201, so as to achieve a multi-touch function.

For example, the plurality of first electrode leads 204 extend in the same direction. As shown in FIG. 2A, the plurality of first electrode leads 204 extend in a Y direction. It should be noted that, the plurality of first electrode leads 204 may also extend in different directions. For example, one part of the plurality of first electrode leads 204 extends in the Y direction, and the remaining part of the plurality of first electrode leads 204 extends in a direction opposite to the Y direction, so that the wiring width of the electrode leads on the touch panel can be reduced.

For example, the touch panel also comprises a flexible circuit board (not shown in FIGS. 2A-2C). In an example, the flexible circuit board may be disposed on the first insulation layer 203, the first electrode lead 203 extends to the flexible circuit board, and the second electrode lead 205 extends to the flexible circuit board, for example, through a via provided in the first insulation layer 203. The flexible circuit board can be electrically connected with an external touch chip (not shown in FIGS. 2A-2C), so the external touch chip can apply control signals to the touch panel or read control signals from the touch panel, so as to achieve touch detection and control.

For example, as shown in FIG. 2A, the touch panel further comprises at least one third electrode lead 206. The third electrode lead 206 is connected between the second touch electrode 202 and a ground line 207, and is used for transmitting the electrostatic charges on the second touch electrode 202 to the ground line 207, so as to achieve in-plane electrostatic discharge, prevent the electrostatic charge from causing ESD damage to the touch panel, ameliorate the undesirable phenomenon of the ESD of the touch panel, and improve the yield rate of a product.

For example, a switch element may be provided on the third electrode lead 206. In a case that the touch panel needs to be electrostatically discharged, the switch element is turned on, so that the second touch electrode 202 is connected to the ground line 207 through the third electrode lead 206, so as to perform electrostatic charges transmission; in a case that the touch panel does not need to perform an electrostatic discharge function, the switch element is turned off to disconnect the second touch electrode 202 from the ground line 207, so that in a process of touch operation, the ground line 207 is prevented from affecting the coupling capacitor between the first touch electrode 201 and the second touch electrode 202.

For example, the first display electrode 101 is a pixel electrode connected to a switch element (such as a thin film transistor) in a sub-pixel or a common electrode connected to a common electrode line in the sub-pixel, and the pixel electrode or the common electrode may be, for example, a slit electrode.

Figure 5A:
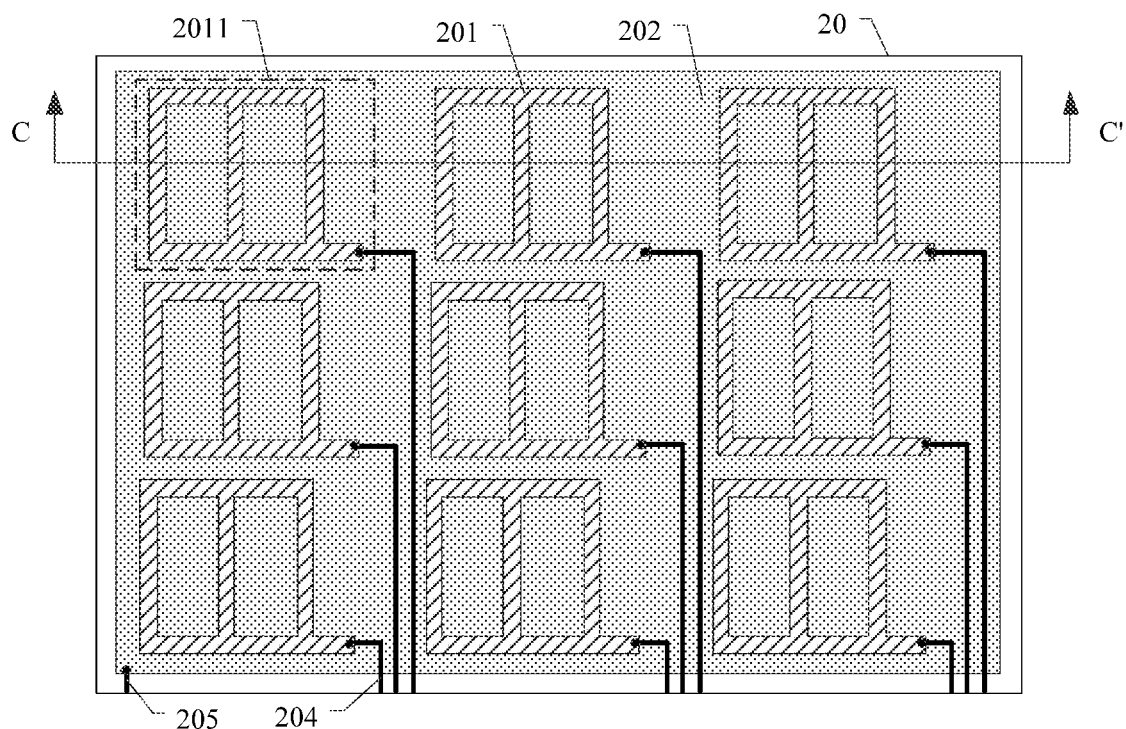
FIG. 5A is a planar schematic diagram of a first substrate of another touch panel provided by an embodiment of the present disclosure.
Figure 5B:
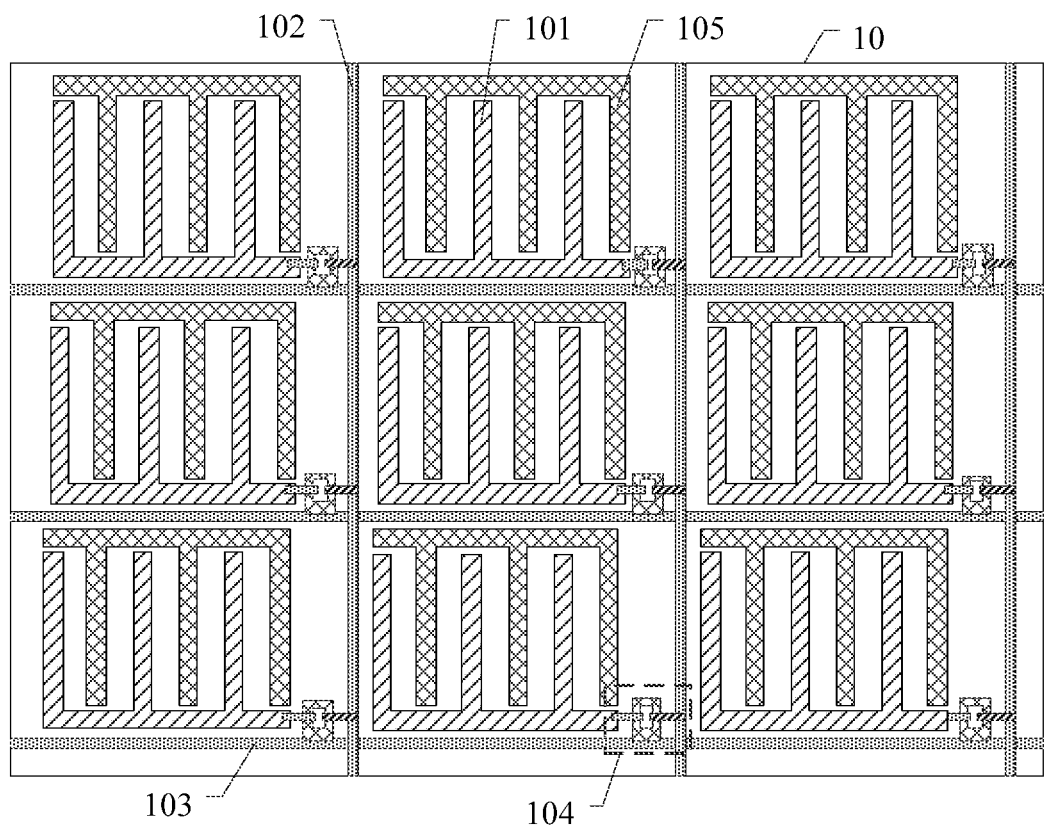
FIG. 5B is a planar schematic diagram of a second substrate of another touch panel provided by an embodiment of the present disclosure.
Figure 5C:
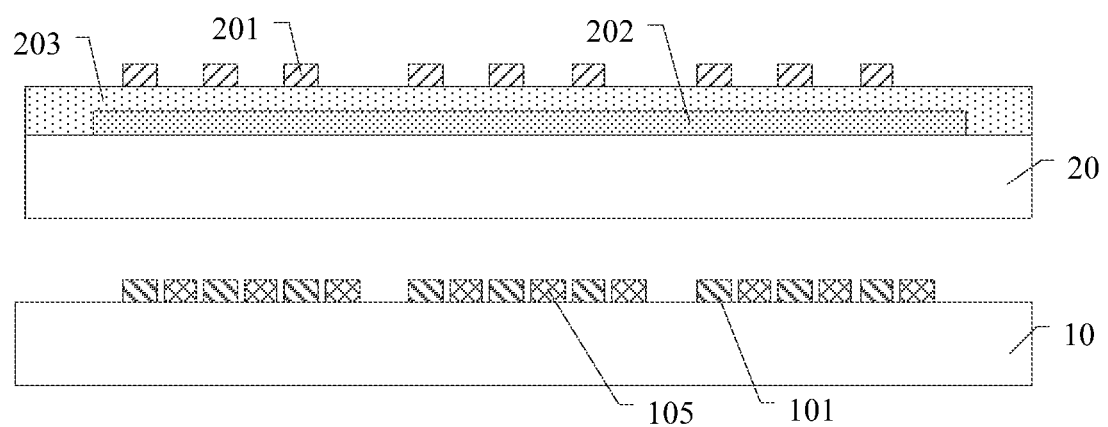
FIG. 5C is a cross-sectional structural schematic diagram of the touch panel along a line C-C' show in FIG. 5A.

FIG. 5A shows a planar schematic diagram of a first substrate of another touch panel provided by an embodiment of the present disclosure; FIG. 5B shows a planar schematic diagram of a second substrate of another touch panel provided by an embodiment of the present disclosure; FIG. 5C is a cross-sectional structural schematic diagram of the touch panel along a line C-C' show in FIG. 5A.

For example, as shown in FIG. 5A to FIG. 5C, in an example, the touch panel further comprises a plurality of second display electrodes 105. The first display electrodes 101 and the second display electrodes 105 may be, for example, on the same layer, and may be at least partially interleaved or staggered with each other. For example, a first display electrode 101 comprises a plurality of display electrode stripes disposed at intervals, a second display electrode 102 also comprises a plurality of display electrode stripes disposed at intervals, and the electrode stripes of the first display electrode 101 and the electrode stripes of the second display electrode 105 are alternately arranged with each other, so that the touch panel may be applied to an in-plane switching (IPS) liquid crystal panel.

Figure 5D:
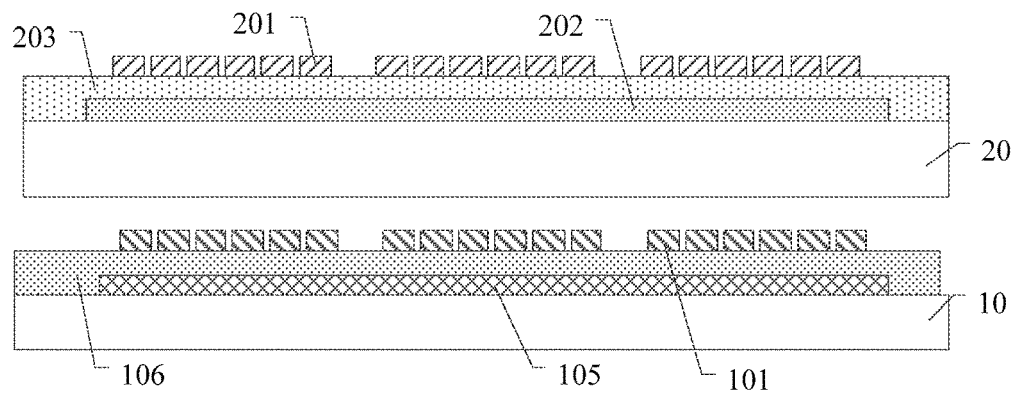
FIG. 5D is a cross-sectional structural schematic diagram of a touch panel provided by an embodiment of the present disclosure.

For another example, as shown in FIG. 5D, the first display electrodes 101 and the second display electrodes 105 may also be stacked and insulated, that is, the first display electrodes 101 and the second display electrodes 105 may be located in different layers. For example, the first display electrodes 101 are comb-formed electrodes, the second display electrodes 105 are plate electrodes, or the first display electrodes 101 are plate electrodes, the second display electrodes 105 are comb-formed electrodes; the first display electrodes 101 and the second display electrodes 105 are separated from each other by a second insulation layer 106, so that the first display electrodes 101 and the second display electrodes 105 are insulated from each other, and therefore the touch panel can also be applied to an advanced super dimension switch (ADS) liquid crystal panel.

For example, the first display electrodes 101 are pixel electrodes, and the second display electrodes 105 are common electrodes; or the first display electrodes 101 are common electrodes, and the second display electrodes 105 are pixel electrodes.

For example, the first display electrodes 101 and the second display electrodes 105 may be transparent electrodes, so that the aperture ratio and the transmittance of the liquid crystal panel can be increased.

For another example, the first display electrodes 101 and the second display electrodes 105 are stacked and insulated, and the first display electrodes 101 and the second display electrodes 105 are comb-formed electrodes, so that the touch panel can also be applied to a fringe field switching (FFS) liquid crystal display panel.

For example, the touch electrode pattern 2011 formed by the first touch electrode 201 is the same as the display electrode pattern formed by the first display electrode 101. In an example, as shown in FIG. 5A to FIG. 5C, the first display electrode 101 may comprise three display electrode stripes, that is, the display electrode pattern is formed by three display electrode stripes, so that the touch electrode pattern 2011 can also be formed by three touch electrode stripes.

Figure 6A:
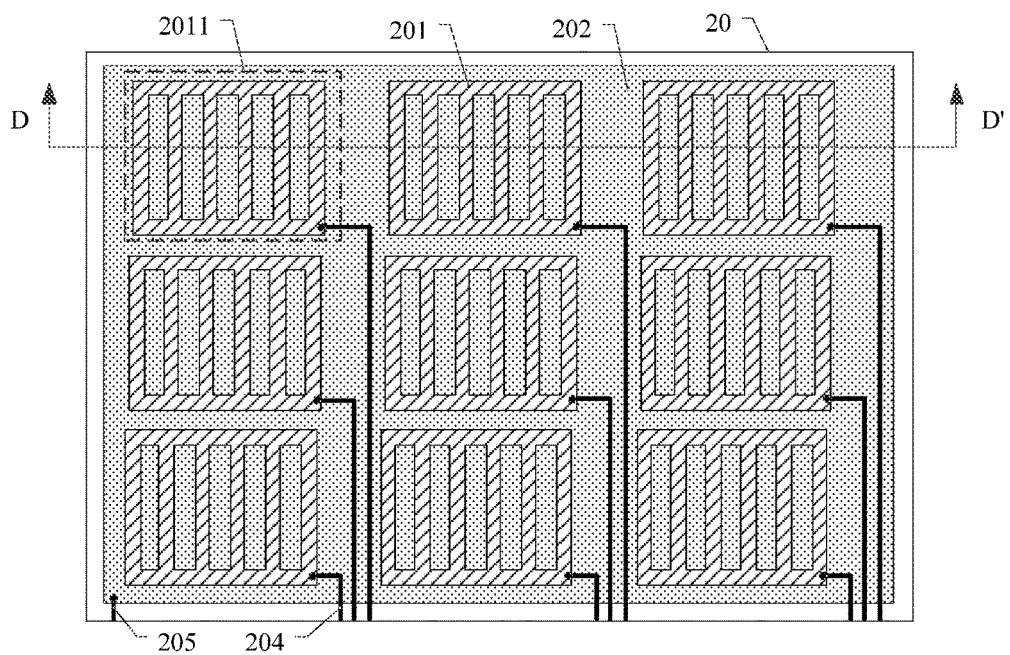
FIG. 6A is a planar schematic diagram of a first substrate of still another touch panel provided by an embodiment of the present disclosure.
Figure 6B:
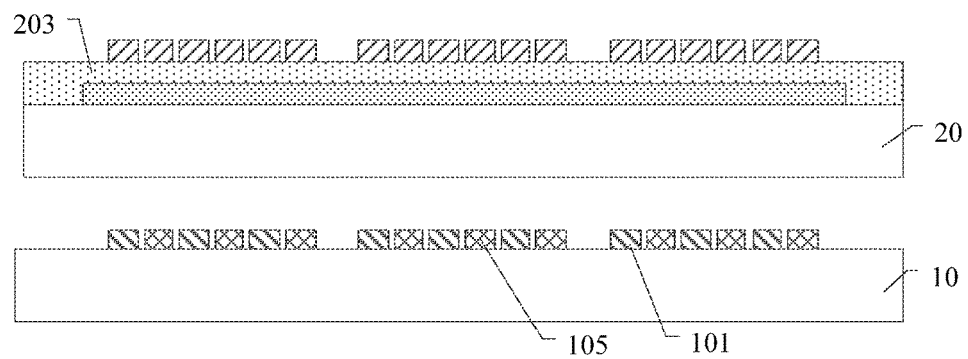
FIG. 6B is a cross-sectional structural schematic diagram of the touch panel along a line D-D' show in FIG. 6A.

FIG. 6A shows a planar schematic diagram of a first substrate of still another touch panel provided by an embodiment of the present disclosure; FIG. 6B is a cross-sectional structural schematic diagram of the touch panel along a line D-D' show in FIG. 6A.

For example, as shown in FIG. 2B, the second substrate 10 is also provided with a plurality of data lines 102 and a plurality of scan lines 103. The plurality of data lines 102 and the plurality of scan lines 103 cross each other to define a plurality of display regions, and each display region comprises a first display electrode 101 and a second display electrode 102. The touch electrode pattern 2011 formed by the first touch electrode 201 may also be the same as the display electrode pattern 1011 in one display area. As shown in FIG. 6A and FIG. 6B, in an example, the first touch electrode 101 comprises three display electrode stripes, the second display electrode 105 also comprises three display electrode stripes, that is, the display electrode pattern is formed by six display electrode stripes, so that the touch electrode pattern 2011 can also be formed by six touch electrode stripes.

For example, as shown in FIG. 2B, a thin film transistor 104 is disposed at a position where a data line 102 and a scan line 103 intersect. The thin film transistor 104 may be used as a switch element of the display area.

For example, the first touch electrode 201 may be a touch drive electrode or a touch sense electrode, correspondingly, the second touch electrode 202 is a touch sense electrode or a touch drive electrode.

For example, the first touch electrode 201 and the second touch electrode 202 may be transparent electrodes.

For example, the transparent electrodes may be made of transparent conductive materials or other suitable materials, and the transparent conductive materials may be, for example, indium tin oxide (ITO), indium zinc oxide (IZO), indium oxide ($In_2O_3$), aluminum zinc oxide (AZO), carbon nanotubes, or the like.

For example, materials of the first electrode lead 204, the second electrode lead 205, and the third electrode lead 206 may be metal conductive materials, for example, the first electrode lead 204, the second electrode lead 205, and the third electrode lead 206 may be formed of one or more metals selected from molybdenum, copper, aluminum, titanium, or one or more alloys formed of any combination of the above metals, or other suitable materials. The materials of the first electrode lead 204, the second electrode lead 205, and the third electrode lead 206 may also be transparent conductive materials, so the first electrode lead 204, the second electrode lead 205, and the third electrode lead 206 may not affect the aperture ratio of the touch panel.

For example, the first substrate 20 may be a transparent insulation substrate, and the second substrate 10 may also be a transparent insulation substrate. The transparent insulation substrate may be a glass substrate, a quartz substrate, a plastic substrate, a ceramic substrate, a silicone substrate, or other suitable substrate.

For example, examples of a material of the first insulation layer 203 comprise silicon nitride (SiNx), silicon oxide (SiOx), silicon oxynitride (SiNxOy) or other suitable materials. Examples of a material of the second insulation layer 106 also comprise silicon nitride (SiNx), silicon oxide (SiOx), silicon oxynitride (SiNxOy) or other suitable materials.

It should be noted that, in order to clearly display the above connection relationship, FIG. 2A only shows the first touch electrodes 201 in three rows and three columns and one second touch electrode 202. Apparently, the touch panel provided in the embodiments of the present disclosure can also provide more first touch electrodes 201 and second touch electrodes 202, and the present disclosure is not limited thereto. It is noted that, in the touch panel provided by the embodiments of the present disclosure, the plurality of first electrode leads and at least one second electrode lead do not need to be routed at an edge of the touch panel, so the touch panel can be applied to a narrow frame electronic product or even a frameless electronic product.

Figure 7:
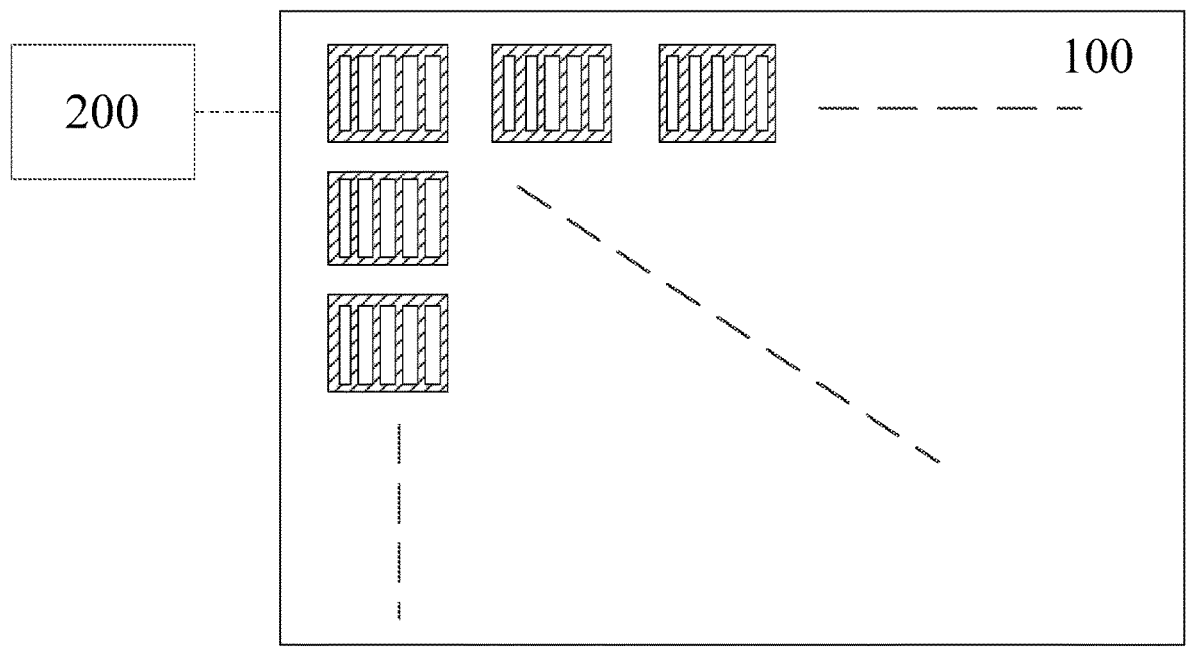
FIG. 7 is a planar schematic diagram of a touch device provided by an embodiment of the present disclosure.
Figure 8:
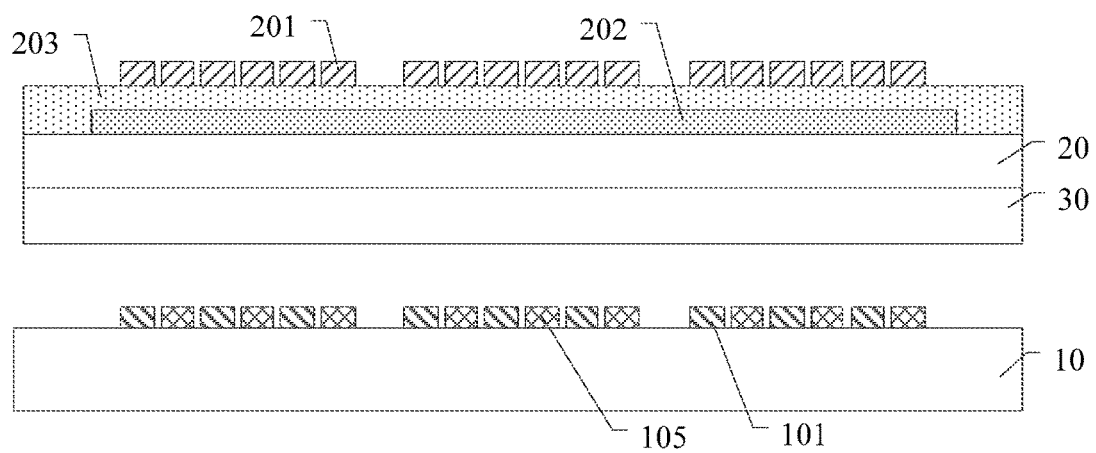
FIG. 8 is a cross-sectional structural schematic diagram of a touch device provided by an embodiment of the present disclosure.

An embodiment of the present disclosure further comprises a touch device. FIG. 7 shows a planar schematic diagram of a touch device provided by an embodiment of the present disclosure; FIG. 8 shows a cross-sectional structural schematic diagram of a touch device provided by an embodiment of the present disclosure.

For example, as shown in FIG. 7, the touch device comprises any one of the touch panels 100 described above. The touch panel 100 is configured to accept touch information. The touch electrode pattern formed by the first touch electrode of the touch panel 100 match with the display electrode pattern formed by the first display electrode of the touch panel 100, so as to avoid the spatial beat frequency effect between the periodic first touch electrodes and the periodic first display electrodes, avoid the moiré phenomenon, and improve the quality of the display image.

For example, the touch panel 100 may be of various types, such as any one of an OGS (one glass solution) type touch panel, an In-Cell type touch panel, or an On-Cell type touch panel.

For example, the touch device further comprises a touch chip 200. The touch chip 200 is configured to apply electrical signals to the first touch electrode or the second touch electrode, and correspondingly, the touch chip 200 is further configured to read electrical signals from the second touch electrode or the first touch electrode, so as to achieve touch detection. For example, the touch chip 200 is electrically connected to the first touch electrode and the second touch electrode through the first electrode lead and the second electrode lead respectively, so as to transmit electrical signals.

For example, the touch chip 200 may be provided separately or may be integrally formed with other computing devices, for example, the touch chip 200 may be implemented with a dedicated computing device (such as a digital signal processor (DSP), etc.) or a general-purpose computing device (such as a central processing unit (CPU)).

For example, the touch panel 100 may also be configured to display an image, and the first substrate is on a display side of the touch panel 100.

For example, the touch panel 100 may be a liquid crystal touch panel, and the first substrate and the second substrate are arranged oppositely in pairs. For example, the first substrate is an opposite substrate, and the second substrate is an array substrate. The opposite substrate is, for example, a color filer substrate, a polarizing layer is on the color filer substrate, the first touch electrode and the second touch electrode are disposed between a base substrate of the color filer substrate and the polarizing layer, in this case, the touch panel 100 is an On-Cell type touch panel.

For example, as shown in FIG. 8, in an example, the touch panel 100 may also comprise a third substrate 30. The touch panel 100 may be a liquid crystal touch panel. The second substrate 10 and the third substrate 30 are arranged oppositely in pairs to form a display panel, the second substrate 10 is an array substrate, and the third substrate 30 is an opposite substrate. For example, the opposite substrate may be a color filer substrate, so that a color film layer, a black matrix, or the like are provided on the third substrate 30. The first substrate 20 may be on a side of the third substrate 30 far away from the second substrate 10. In this case, the first substrate 20 and the display panel may be separately manufactured and then assembled together.

For example, the touch panel 100 may also be an organic light emitting diode (OLED) touch panel, the first substrate is a package substrate, and the second substrate is an array substrate.

For example, the touch panel 100 provided by the embodiment of the present disclosure may be a rectangular touch panel, a circular touch panel, an elliptical touch panel, a polygonal touch panel, or the like. In addition, the touch panel 100 may be not only a flat touch panel but also a curved touch panel, or even a spherical touch panel.

For example, the touch device may be a television, a digital camera, a smart phone, a watch, a tablet, a notebook, a navigator, or any products or components having a touch function.

An embodiment of the present disclosure further provides a manufacture method of a touch panel, and the manufacture method may be used to manufacture the touch panel described in any one of the above embodiments. FIG. 9 shows a schematic flow chart of a manufacture method of a touch panel provided by an embodiment of the present disclosure.

For example, as shown in FIG. 9, the manufacture method may comprise the following steps:

Step S1: forming a plurality of first touch electrodes and at least one second touch electrode, each of the plurality of first touch electrodes comprising at least one touch electrode pattern, and the plurality of first touch electrodes and the second touch electrode being stacked and insulated from each other;

Step S2: forming a plurality of first display electrodes, each of the plurality of first display electrodes comprising a display electrode pattern.

For example, in the step S1 and the step S2, the touch electrode pattern and the display electrode pattern match with each other, so as to reduce or avoid the moiré phenomenon, and improve the quality of the display image.

For example, the touch panel comprises a first substrate and a second substrate, and the first substrate and the second substrate are arranged parallel to each other. In the step S1, the first touch electrode and the second touch electrode is formed on the first substrate. In the step S2, the first display electrode is formed on the second substrate.

For example, in an example of the embodiment of the present disclosure, the step S1 may comprise: depositing a first conductive layer on the first substrate, the first conductive layer being used to form a second touch electrode; then depositing an insulation film layer on the second touch electrode, so as to form a first insulation layer; next, forming a second conductive layer on the first insulation layer by using a patterning process, the second conductive layer being used to form a first touch electrode, and the first touch electrode comprising at least one touch electrode pattern.

For example, the first touch electrode and the second touch electrode are stacked and can be insulated from each other through the first insulation layer.

For example, the first conductive layer and the second conductive layer may be deposited by using a vapor deposition method, a magnetron sputtering method, a vacuum evaporation method, or other suitable methods.

For example, materials of the first conductive layer and the second conductive layer may be transparent conductive materials or other suitable materials, such as indium tin oxide (ITO), indium zinc oxide (IZO), carbon nanotubes, and the like.

For example, the insulation film may be deposited by chemical vapor deposition (CVD) such as plasma enhanced chemical vapor deposition (PECVD) and low pressure chemical vapor deposition (LPCVD), or physical vapor deposition (PVD), or the like.

For example, the first touch electrode and the second touch electrode are provided in the mutual-capacitive touch technology, so as to achieve a multi-touch function. In a direction perpendicular to the first substrate, the first touch electrode and the second touch electrode at least partially overlap, and a coupling capacitor is formed at an overlap position to sense a touch operation.

For example, the plurality of first touch electrodes are in one-to-one correspondence to the plurality of first display electrodes, the plurality of first touch electrodes are arranged in an array on the first substrate, and the plurality of first display electrodes are arranged in an array on the second substrate. In the direction perpendicular to the first substrate, the touch electrode pattern and the display electrode pattern substantially overlap with each other, so as to further avoid the moiré phenomenon.

For example, the second touch electrode may be a plate electrode. The plate electrode can achieve in-plane electrostatic discharge, so as to avoid ESD damage caused by the accumulation of electrostatic charges on the touch panel, ameliorate the undesirable phenomenon of ESD, and improve the yield rate of the touch product.

For example, the first display electrode comprises a plurality of display electrode stripes disposed at intervals, and correspondingly, the first touch electrode comprises a plurality of touch electrode stripes disposed at intervals.

For example, in an example of the embodiment of the present disclosure, the step S2 further comprises: forming a second display electrode on the second substrate. For example, the second display electrode also comprises a plurality of display electrode stripes disposed at intervals, the first display electrode and the second display electrode are formed in the same layer, and the electrode stripes of the first display electrode and the electrode stripes of the second display electrode are at least partially interleaved or staggered with each other. For another example, the first display electrode and the second display electrode may also be stacked and insulated, that is, the first display electrode and the second display electrode may be located in different layers.

For example, one of the first display electrode and the second display electrode is a pixel electrode, and the other of the first display electrode and the second display electrode is a common electrode.

For the present disclosure, the following statements should be noted:

(1) the accompanying drawings involve only the structure(s) in connection with the embodiment(s) of the present disclosure, and other structure(s) can be referred to in common design(s); and (2) in case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto, and the protection scope of the present disclosure should be based on the protection scope of the claims.

What is claimed is:

1. A touch panel, comprising:
a plurality of first touch electrodes and at least one second touch electrode; and
a plurality of first display electrodes,
wherein the plurality of first touch electrodes and the at least one second touch electrode are stacked and insulated from each other, each of the plurality of first touch electrodes comprises at least one touch electrode pattern, each of the plurality of first display electrodes comprises a display electrode pattern, and the touch electrode pattern and the display electrode pattern match with each other,
the touch panel further comprises a first substrate and a second substrate disposed parallel to each other,
the at least one second touch electrode comprises a plurality of second touch electrodes, the plurality of second touch electrodes are insulated from each other,
the plurality of first touch electrodes are arranged in an array of rows and columns on the first substrate, the plurality of second touch electrodes are on the first substrate,
each of the plurality of second touch electrodes corresponds to at least two first touch electrodes, and
the plurality of second touch electrodes are arranged in rows, each second touch electrode of the plurality of second touch electrodes corresponds to all first touch electrodes in at least one row, and orthographic projections of the all first touch electrodes in the at least one row on the first substrate are located within an orthographic projection of the each second touch electrode on the first substrate, or
the plurality of second touch electrodes are arranged in columns, each second touch electrode of the plurality of second touch electrodes corresponds to all first touch electrodes in at least one column, and orthographic projections of the all first touch electrodes in the at least one column on the first substrate are located within an orthographic projection of the each second touch electrode on the first substrate.

2. The touch panel according to claim 1, wherein the touch electrode pattern comprises a plurality of touch electrode strips, and the display electrode pattern comprises a plurality of display electrode strips.

3. The touch panel according to claim 1, further comprising at least one third electrode lead,
wherein the at least one third electrode lead is connected between the at least one second touch electrode and a ground line, and is used for transmitting electrostatic charges on the at least one second touch electrode to the ground line.

4. The touch panel according to claim 1, wherein the plurality of first touch electrodes, the at least one second touch electrode and the plurality of first display electrodes are all transparent electrodes.

5. The touch panel according to claim 1, wherein the plurality of first display electrodes are pixel electrodes or common electrodes.

6. The touch panel according to claim 1, further comprising a plurality of second display electrodes,
wherein the plurality of first display electrodes and the plurality of second display electrodes are stacked and insulated from each other,
the plurality of first display electrodes are comb-shaped electrodes while the plurality of second display electrodes are plate electrodes, or the plurality of first display electrodes are plate electrodes while the plurality of second display electrodes are comb-shaped electrodes, and the plurality of first display electrodes are pixel electrodes while the plurality of second display electrodes are common electrodes, or the plurality of first display electrodes are common electrodes while the plurality of second display electrodes are pixel electrodes.

7. The touch panel according to claim 1, further comprising a plurality of first electrode leads and at least one second lead, wherein the plurality of first electrode leads are electrically connected with the plurality of first touch electrodes and are used for transmitting electrical signals, and the at least one second lead is electrically connected with the at least one second touch electrode and is used for transmitting an electrical signal.

8. The touch panel according to claim 7, wherein the plurality of first electrode leads are electrically connected with the plurality of first touch electrodes in one-to-one correspondence.

9. The touch panel according to claim 7, wherein the plurality of first electrode leads extend in a same direction.

10. The touch panel according to claim 1, wherein the plurality of first display electrodes are arranged in an array on the second substrate, and, in a direction perpendicular to the first substrate, the touch electrode pattern and the display electrode pattern substantially overlap each other.

11. The touch panel according to claim 10, wherein the plurality of first touch electrodes and the second touch electrode are on a same side or different sides of the first substrate, and, with respect to the plurality of first touch electrodes, the second touch electrode is closer to the second substrate.

12. The touch panel according to claim 10, wherein the first substrate and the second substrate are opposite to each other to form a liquid crystal touch panel, the first substrate is an opposite substrate, and the second substrate is an array substrate.

13. The touch panel according to claim 10, further comprising a third substrate, wherein the second substrate and the third substrate are opposite to each other to form a liquid crystal touch panel, the second substrate is an array substrate, the third substrate is an opposite substrate, and the first substrate is on a side of the third substrate far away from the second substrate.

14. A touch device, comprising the touch panel according to claim 1.

15. The touch device according to claim 14, further comprising a touch chip, wherein the touch chip is configured to apply electrical signals to the plurality of first touch electrodes or the at least one second touch electrode, and correspondingly the touch chip is further configured to read electrical signals from the at least one second touch electrode or the plurality of first touch electrodes.

16. The touch device according to claim 14, wherein the touch panel is configured to display an image, and the plurality of first touch electrodes and the at least one second touch electrode are on a display side of the touch panel.

17. A manufacture method applied to the touch panel according to claim 1, comprising:

forming the plurality of first touch electrodes and the at least one second touch electrode, each of the plurality of first touch electrodes comprising the at least one touch electrode pattern, wherein the plurality of first touch electrodes and the second touch electrode are stacked and insulated from each other; and forming the plurality of first display electrodes, each of the plurality of first display electrodes comprising the display electrode pattern, wherein the touch electrode pattern and the display electrode pattern match with each other.

* * * * *